US009325201B1

(12) United States Patent
Aronov et al.

(10) Patent No.: US 9,325,201 B1
(45) Date of Patent: Apr. 26, 2016

(54) HIGH-POWER CHARGING DEVICES FOR CHARGING ENERGY-STORAGE DEVICES

(71) Applicant: StoreDot Ltd., Herzeliya (IL)

(72) Inventors: Daniel Aronov, Netanya (IL); Maxim Liberman, Haifa (IL); Leonid Spindler, Kfar Sava (IL)

(73) Assignee: StoreDot, Ltd., Herzeliya (IL)

( * ) Notice: Subject to any disclaimer, the term of this patent is extended or adjusted under 35 U.S.C. 154(b) by 0 days.

(21) Appl. No.: 14/735,280

(22) Filed: Jun. 10, 2015

Related U.S. Application Data

(63) Continuation of application No. PCT/IL2015/050146, filed on Feb. 10, 2015.

(51) Int. Cl.
*H02J 7/00* (2006.01)
*H02J 7/06* (2006.01)
*H02J 7/04* (2006.01)

(52) U.S. Cl.
CPC .... *H02J 7/06* (2013.01); *H02J 7/04* (2013.01)

(58) Field of Classification Search
CPC ........................................................ H02J 7/06
USPC ........................................................ 320/139
See application file for complete search history.

(56) References Cited

U.S. PATENT DOCUMENTS

| 3,875,490 A | 4/1975 | Ackermann |
| 4,024,448 A | 5/1977 | Christianson et al. |
| 4,255,782 A | 3/1981 | Joyce |
| 5,463,304 A | 10/1995 | Winters |
| 6,278,279 B1 | 8/2001 | Daun-Lindberg et al. |
| 8,018,204 B2 | 9/2011 | Bourilkov et al. |
| 8,963,496 B2 * | 2/2015 | Yang ............... H01M 2/1066 320/113 |
| 2009/0091298 A1 | 4/2009 | Bourilkov et al. |

OTHER PUBLICATIONS

International Search Report for International Application No. PCT/IL2015/050146 dated May 20, 2015.

* cited by examiner

*Primary Examiner* — Richard V Muralidar
(74) *Attorney, Agent, or Firm* — Pearl Cohen Zedek Latzer Baratz LLP

(57) ABSTRACT

The present invention discloses charging devices for charging energy-storage devices. Charging devices include: an Electro-Magnetic Interference/Radio-Frequency Interference (EMI/RFI) filter for passively suppressing conducted interference present on an alternating-current (AC) power source; optionally, a transformer for transforming power from the AC power source without changing frequency; a rectifier for converting an AC input to a direct-current (DC) output; and a voltage-controlled charger for providing a high-power output having an output voltage and an output current from the AC power source, wherein the output voltage and the output current from the voltage-controlled charger are pulsating DC signals. Preferably, the high-power output has a power-factor value of: greater than about 0.70, greater than about 0.80, greater than about 0.90, greater than about 0.95, or greater than about 0.97. Preferably, the high-power output is a wattage of: greater than about 40W, greater than about 50W, greater than about 60W, or greater than about 70W.

6 Claims, 5 Drawing Sheets

HIGH-POWER CHARGING DEVICES FOR CHARGING ENERGY-STORAGE DEVICES

CROSS REFERENCE TO RELATED APPLICATIONS

This patent application is a continuation application of the PCT application No. PCT/IL2015/050146, filed Feb. 10, 2015, which is hereby incorporated by reference in its entirety.

FIELD AND BACKGROUND OF THE INVENTION

The present invention relates to high-power charging devices for charging energy-storage devices.

Modern electronic appliances are becoming ubiquitous for personal as well as business use. It cannot be overstated that with the evolution of such devices, mobility has emerged as a key driver in feature enhancement for technological innovation. The proliferation of smart phones, tablets, laptops, ultrabooks, and the like (acquiring smaller and smaller form factors) has made charging times a critical as consumers are eager to have longer and longer device usage times between recharge cycles, without adding heft to the weight and footprint of such devices.

Such aspects apply equally as well to electric cars such as the Tesla Model S and the Chevy Volt. Currently, the dominant energy storage device remains the battery, particularly the lithium-ion battery—powering nearly every portable electronic device, as well as almost every electric car. Electric-vehicle batteries can run on the same technology as mobile devices, with deployment of upwards of about 7,000 battery cells.

Most mobile-device chargers are not really chargers, but rather only power adaptors that provides a power source for the charging circuitry, which is usually contained within the mobile device. Mobile-device chargers are simply AC-to-DC converters. Such chargers convert an input of 86-260 Volts AC (RMS) into an output voltage of around 5 Volts DC. Generally, the output voltage of the charger is in the range of 5 to 5.5 Volts DC (e.g., suitable for cellphones). Mobile devices having internal rechargeable batteries need to be charged with a DC voltage slightly higher than the battery voltage supplied by simple mobile-device chargers.

Such simple chargers operate by first accepting an AC power source (e.g., an AC wall outlet), down-converting the source power to a lower AC voltage via a transformer, and then passing the output voltage through an AC-DC converter (i.e., a rectifier). The output voltage is finally passed through a filter circuit to provide a clean output voltage to the charger pins.

Referring to the drawings, FIG. 1 is an electrical schematic diagram of a typical power-adaptor configuration, according to the prior art. The power-adaptor configuration of FIG. 1 includes: an Electro-Magnetic Interference/Radio-Frequency Interference (EMI/RFI) filter, a rectifier, a first capacitor, electronic switching circuitry, a high-frequency transformer, and a high-frequency rectifier, and a second capacitor. The output voltage of such a power adaptor is used to charge a mobile device, for example.

FIG. 2 is an electrical schematic diagram of a typical power-adaptor/charger configuration, according to the prior art. The power-adaptor/charger configuration of FIG. 2 includes all the componentry of FIG. 1 plus a voltage-controlled charger after the second capacitor. The charger is generally located inside the mobile device, with the output voltage and current being used to charge the battery or other energy-storage device (e.g. a supercapacitor).

Stringent limitations become significant as the power of the charger increases. Such high-power chargers constrain the performance profile, inter alia, by requiring:
- high-efficiency operation due to the high power, since a small decline in efficiency will result in a large amount of power dissipation wasted in the charger itself, complicating thermal-management aspects for dealing with such power losses;
- maintenance of power-factor unity (i.e., equal or close to one), typically requiring a power-factor correction (PFC) circuit in the charger design;
- low EMI/RFI, further requiring a PFC circuit; and
- cost and weight minimization would be strongly desired.

PFC for harmonic reduction shapes the input current of off-line power supplies to maximize the real power available from the mains (i.e., line power). Ideally, the electrical device should present a load that simulates the characteristics of a pure resistor in which the reactive power drawn by the device is zero. Such a situation inherently excludes any input-current harmonics—the current perfectly mimics, and is exactly in phase with, the input voltage. In such a case, the current drawn from the mains is minimized according to the real power needed to perform the requisite task. In turn, losses and costs associated not only with power distribution, but also with power generation and the capital equipment involved in the process, are minimized.

In an electric power system, a load with a low power factor draws more current than a load with a high power factor for the same amount of useful power transferred. The higher currents increase the energy lost in the distribution system, and require larger wires and different equipment. Because of the costs of larger equipment and wasted energy, electrical utilities usually charge a higher cost to industrial or commercial customers when a low power factor exists.

Mitigating issues with harmonics also minimizes interference with other devices powered by the same source. Furthermore, PFC is required in order to comply with regulatory requirements for power supplies. Today, electrical equipment in Europe and Japan must comply with IEC61000-3-2. Such a regulatory requirement applies to most electrical appliances with an input power of 75 W (Class D equipment) or greater. Additionally, many energy-efficiency requirements also entail a PFC requirement. With increasing power levels for all equipment and widening applicability of harmonic-reduction standards, more and more power-supply designs are incorporating PFC capability.

Designers are faced with the difficult task of incorporating PFC, while meeting other regulatory requirements such as standby power reduction, active-mode efficiency, and EMI/RFI limits. FIG. 3 is an electrical schematic diagram of a typical power-adaptor/charger configuration incorporating a PFC circuit, according to the prior art. The power-adaptor/charger configuration of FIG. 3 includes all the componentry of FIG. 2 plus a PFC circuit between the rectifier and electronic switching circuitry, with a high-voltage capacitor replacing the first capacitor. The output voltage and current are used to charge a battery or other energy-storage device. PFC circuits dramatically increase the power-supply manufacturing costs, as well as the weight and size of the unit.

It would be desirable to have high-power charging devices for charging energy-storage devices. Such devices would, inter alia, overcome the various limitations mentioned above, and provide novel advantages to charger technology for mobile devices, electric vehicles, as well as supercapacitors.

SUMMARY

It is the purpose of the present invention to provide high-power charging devices for charging energy-storage devices.

It is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Preferred embodiments of the present invention enable high-power charging devices, which possess high power-factor values, for charging energy-storage devices using a design topology in which, inter alia, the PFC circuit and subsequent high-voltage capacitor are eliminated. Specifically, such a design topology eliminates the need for: a PFC circuit, a high-voltage capacitor after the PFC circuit, high-frequency switching circuitry, a high-frequency transformer, a high-frequency switching rectifier, and a high-frequency capacitor.

Therefore, according to the present invention, there is provided for the first time a charging device for charging energy-storage devices, the charging device including: (a) an Electro-Magnetic Interference/Radio-Frequency Interference (EMI/RFI) filter for passively suppressing conducted interference present on an alternating-current (AC) power source; (b) a transformer for transforming power from the AC power source without changing frequency; (c) a rectifier for converting an AC input to a direct-current (DC) output; and (d) a voltage-controlled charger for providing a high-power output having an output voltage and an output current from the AC power source, wherein the output voltage and the output current from the voltage-controlled charger are pulsating DC signals.

Preferably, the high-power output has a power-factor value selected from the group consisting of: greater than about 0.70, greater than about 0.80, greater than about 0.90, greater than about 0.95, and greater than about 0.97.

Preferably, the high-power output is a wattage selected from the group consisting of: greater than about 40 W, greater than about 50 W, greater than about 60 W, and greater than about 70 W.

According to the present invention, there is provided for the first time a charging device for charging energy-storage devices, the charging device including: (a) an Electro-Magnetic Interference/Radio-Frequency Interference (EMI/RFI) filter for passively suppressing conducted interference present on an alternating-current (AC) power source; (b) a rectifier for converting an AC input to a direct-current (DC) output; and (c) a voltage-controlled charger for providing a high-power output having an output voltage and an output current from the AC power source, wherein the output voltage and the output current from the voltage-controlled charger are pulsating DC signals.

Preferably, the high-power output has a power-factor value selected from the group consisting of: greater than about 0.70, greater than about 0.80, greater than about 0.90, greater than about 0.95, and greater than about 0.97.

Preferably, the high-power output is a wattage selected from the group consisting of: greater than about 40 W, greater than about 50 W, greater than about 60 W, and greater than about 70 W.

These and further embodiments will be apparent from the detailed description that follows.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to high-power charging devices for charging energy-storage devices. The principles and operation for providing such devices, according to the present invention, may be better understood with reference to the accompanying description and the drawings.

Figure 1:
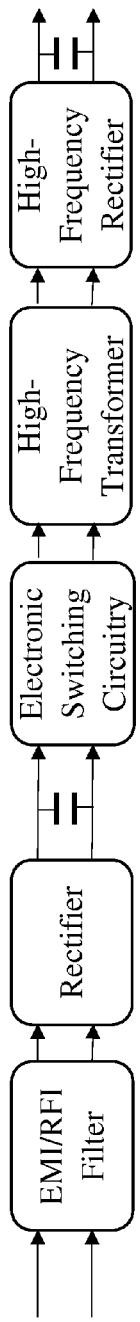
FIG. 1 is an electrical schematic diagram of a typical power-adaptor configuration, according to the prior art.
Figure 2:
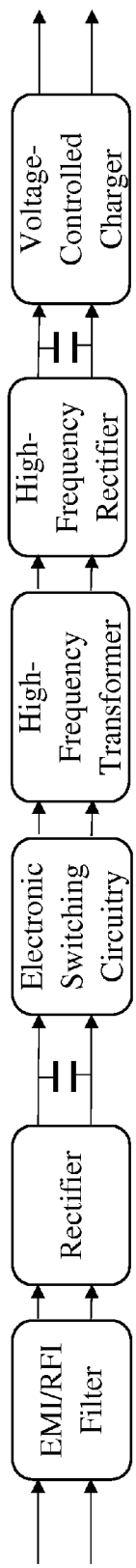
FIG. 2 is an electrical schematic diagram of a typical power-adaptor/charger configuration, according to the prior art.
Figure 4:
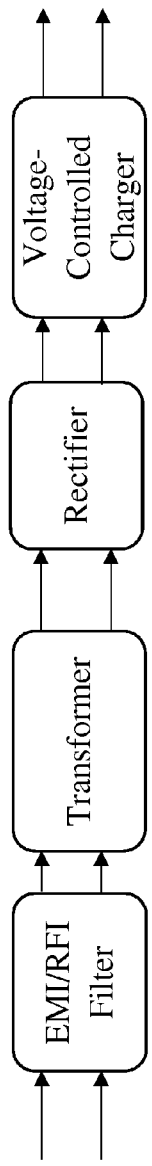
FIG. 4 is an electrical schematic diagram of a high-power charger configuration, according to preferred embodiments of the present invention.

FIG. 4 is an electrical schematic diagram of a high-power charger configuration, according to preferred embodiments of the present invention. The high-power charger configuration of FIG. 4 includes an EMI/RFI filter, a transformer, a rectifier, and a voltage-controlled charger, and operates at very high efficiency with a power factor close to 1. Such a performance attribute reduce the size, cost, weight, and complexity of high-power chargers for energy-storage devices. Moreover, low EMI/RFI values are achieved. The output voltage and current are used to charge a battery or other storage device. It is noted that in low-power applications the schematic configuration of FIG. 2 can be modified to be in accordance with the schematic configuration of FIG. 4 as well.

Figure 5:
FIG. 5 is an electrical schematic diagram of a high-power charger configuration for high-voltage applications, according to preferred embodiments of the present invention.

FIG. 5 is an electrical schematic diagram of a high-power charger configuration for high-voltage applications, according to preferred embodiments of the present invention. The high-power charger configuration of FIG. 5 includes an EMI/RFI filter, a rectifier, and a voltage-controlled charger. For high-voltage applications (e.g., charging an electric vehicle), the transformer of FIG. 4 is unnecessary.

Figure 3:
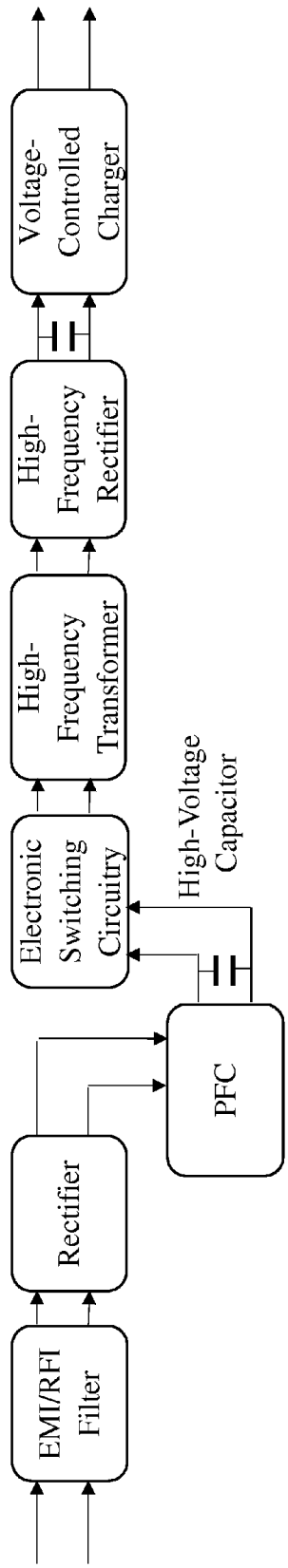
FIG. 3 is an electrical schematic diagram of a typical power-adaptor/charger configuration incorporating a PFC circuit, according to the prior art.
Figure 6:
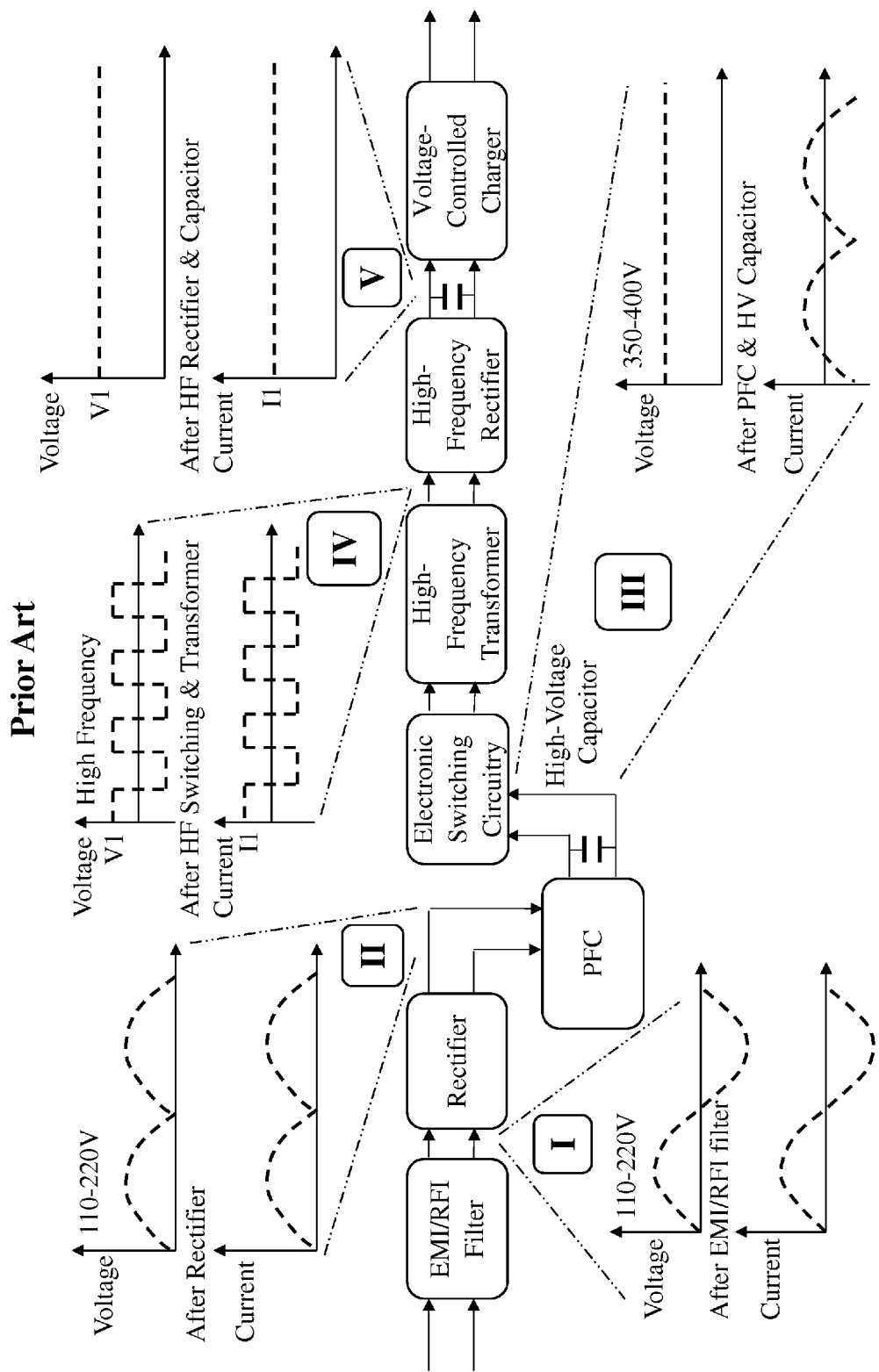
FIG. 6 is an electrical schematic diagram of the power-adaptor/charger configuration of FIG. 3 with graph insets showing the corresponding voltage/current profiles at various points in the electrical scheme, according to the prior art.

FIG. 6 is an electrical schematic diagram of the power-adaptor/charger configuration of FIG. 3 with graph insets showing the corresponding voltage/current profiles at various points in the electrical scheme, according to the prior art. Graph Inset I shows the voltage/current profile after the EMI/RFI filter. Graph Inset II shows the voltage/current profile after the rectifier. Graph Inset III shows the voltage/current profile after the PFC and high-voltage capacitor. Graph Inset IV shows the voltage/current profile after the high-frequency switching and transformer. Graph Inset V shows the voltage/current profile after the high-frequency rectifier and second capacitor.

V1 and I1 are the desired voltage and current values, respectively, obtained on the input to the voltage-controlled charger (Graph Inset V), which is responsible for various charging modes. In the case of standard charging system, V1 and I1 are constant values.

Figure 7:
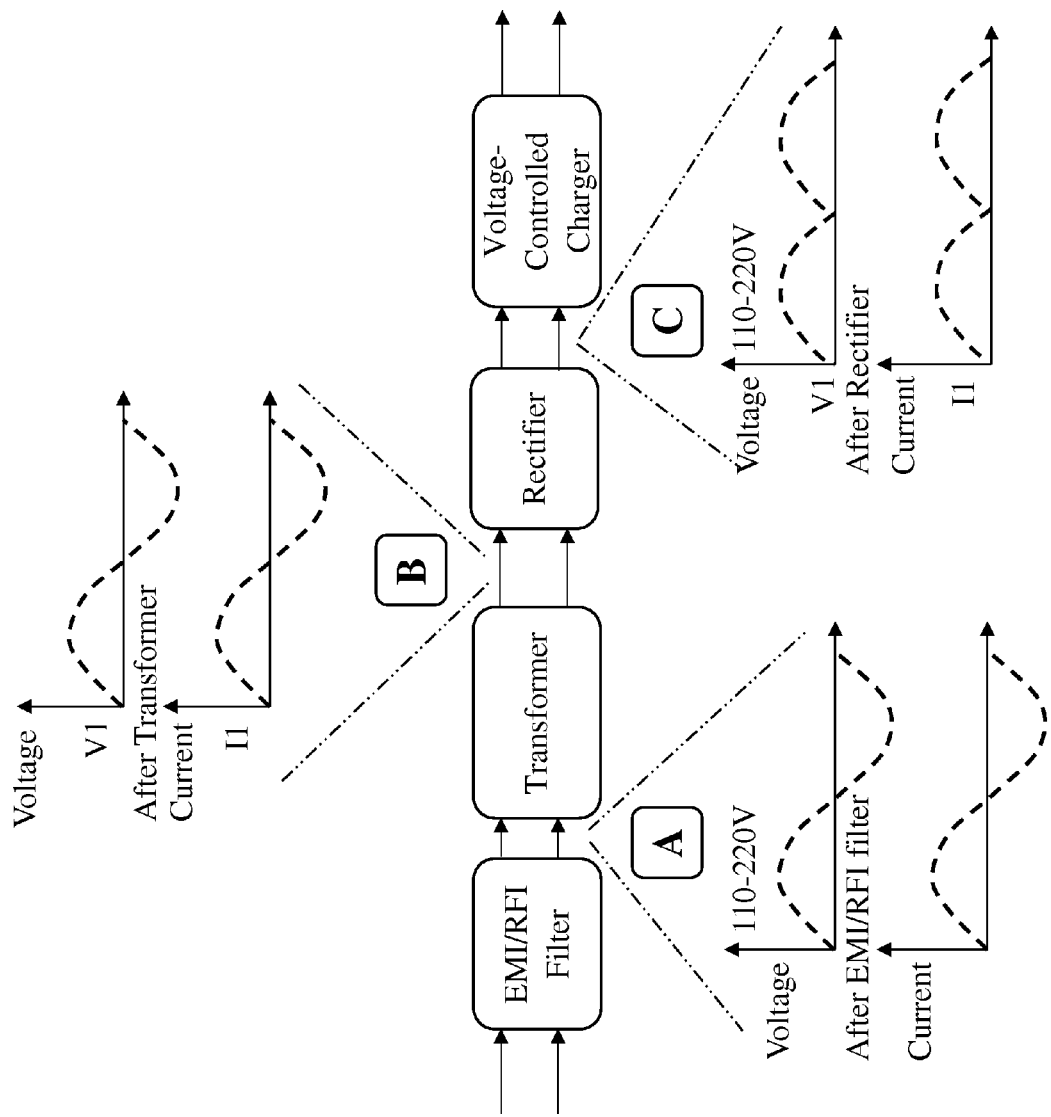
FIG. 7 is an electrical schematic diagram of the high-power charger configuration of FIG. 4 with graph insets showing the corresponding voltage/current profiles at various points in the electrical scheme, according to preferred embodiments of the present invention.

FIG. 7 is an electrical schematic diagram of the high-power charger configuration of FIG. 4 with graph insets showing the corresponding voltage/current profiles at various points in the electrical scheme, according to preferred embodiments of the present invention. Graph Inset A shows the voltage/current profile after the EMI/RFI filter. Graph Inset B shows the voltage/current profile after the transformer. Graph Inset C shows the voltage/current profile after the rectifier.

V1 and I1 are the average values of the pulsating voltage and current signals, respectively. The AC input to the charging system (Graph Insets A and B) is a sinusoidal wave (alternating between positive and negative half cycles), while the voltage and current outputs have same waveform and phase due to the absence of the capacitor at the output of the rectifier (Graph Inset C). The rectified output from the charger is a "pulsating" DC signal having a waveform which ranges only from zero to positive volts, with the negative half of the signal rectified to the positive half. Similarly, the current and voltage have the same waveform and phase. No current harmonics are observed (Graph Inset C), resulting in a high power-factor value.

Figure 8:
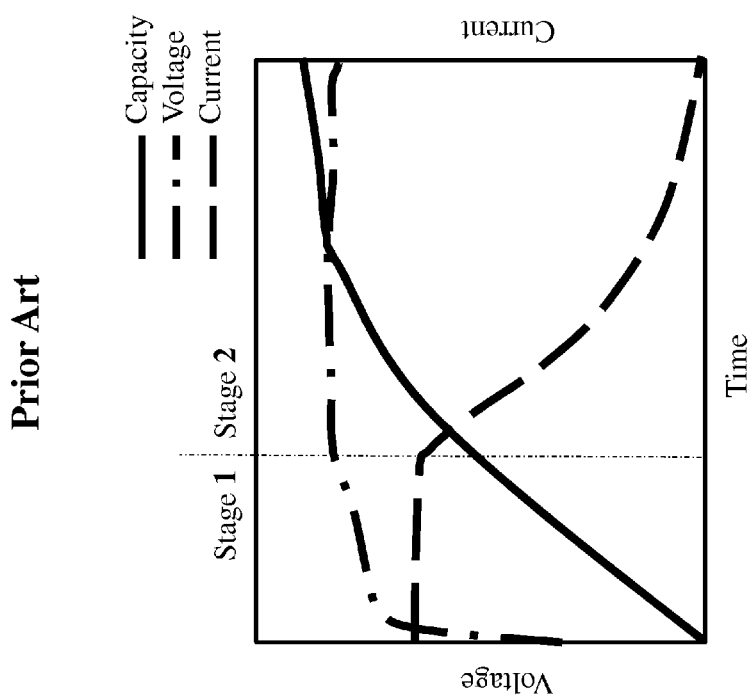
FIG. 8 is a graph of the charge profile for lithium-ion rechargeable batteries using a standard charger in accordance with the power-adaptor/charger configuration of FIG. 3, according to the prior art.

FIG. 8 is a graph of the charge profile for lithium-ion rechargeable batteries using a standard charger in accordance with the power-adaptor/charger configuration of FIG. 3, according to the prior art. When the battery is initially charging, the voltage of the battery rises quickly and then plateaus for the remainder of the charging cycle, while the current is initially constant and then rapidly tails off to zero as shown in FIG. 8. Such charge characteristics are typical of all batteries.

During Stage 1, the voltage of the charging battery rises at a constant current until the cell voltage reaches the proper working voltage (e.g., ~60%). The current applied is the maximum available current for the cell configuration. During Stage 2, when the proper cell voltage is attained, the charging cycle changes to apply a constant voltage until the battery capacity reaches 100% (i.e., the current drops over time to ~0%). Such charging behavior can be achieved using the standard charger configurations of FIG. 2 or 3.

Figure 9:
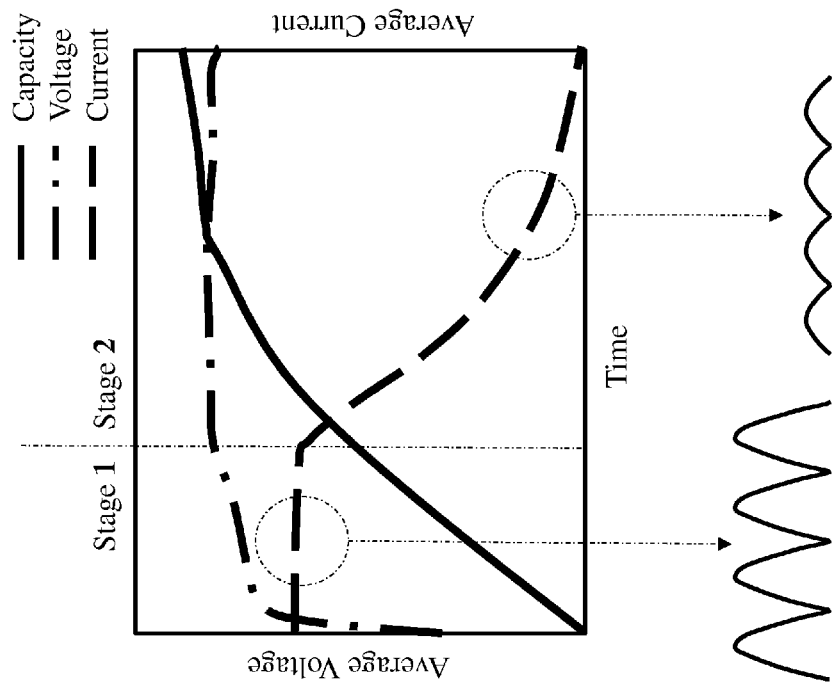
FIG. 9 is a graph of the charge profile for lithium-ion rechargeable batteries using the high-power charger configuration of FIG. 4, according to preferred embodiments of the present invention.

FIG. 9 is a graph of the charge profile for lithium-ion rechargeable batteries using the high-power charger configuration of FIG. 4, according to preferred embodiments of the present invention. It can be readily seen that the charging behavior of FIG. 8 for a similar battery can be achieved using the charger configuration of FIG. 4 (or FIG. 5) with a pulsating DC current as described above with regard to FIG. 7.

While the present invention has been described with respect to a limited number of embodiments, it will be appreciated that many variations, modifications, and other applications of the present invention may be made.

What is claimed is:

1. A high-power charging device for charging energy-storage devices, the high-power charging device comprising:
   (a) an Electro-Magnetic Interference/Radio-Frequency Interference (EMI/RFI) filter for passively suppressing conducted interference present on a received alternating current (AC) power source;
   (b) a transformer directly coupled to the EMI/RFI filter for transforming the power from said AC power source without changing frequency;
   (c) a rectifier directly coupled to the transformer without an electronic switching circuit in between for converting the rectifies the transformed AC power source into a waveform that ranges from zero to positive volts a; and
   (d) a voltage-controlled charger directly coupled to the rectifier without a capacitor in between for providing a power output that is greater than 40 W, the power output comprising an output voltage and an output current that range from zero to positive volts or amps, respectively.

2. The charging device of claim 1, wherein said high-power output has a power factor value selected from the group consisting of: greater than about 0.70, greater than about 0.80, greater than about 0.90, greater than about 0.95, and greater than about 0.97.

3. The charging device of claim 1, wherein said high-power output is a wattage selected from the group consisting of: greater than about 40 W, greater than about 50 W, greater than about 60 W, and greater than about 70 W.

4. A high-power charging device for charging energy-storage devices, the high-power charging device comprising:
   (a) an Electro-Magnetic Interference/Radio-Frequency Interference (EMI/RFI) filter for passively suppressing conducted interference present on a received alternating current (AC) power source;
   (b) a rectifier directly coupled to the EMI/RFI filter without an electronic switching circuit in between for converting the rectifies the AC power source into a waveform that ranges from zero to positive volts a; and
   (c) a voltage-controlled charger directly coupled to the rectifier without a capacitor in between for providing a power output that is greater than 40 W, the power output comprising an output voltage and an output current that range from zero to positive volts or amps, respectively.

5. The charging device of claim 4, wherein said high-power output has a power factor value selected from the group consisting of: greater than about 0.70, greater than about 0.80, greater than about 0.90, greater than about 0.95, and greater than about 0.97.

6. The charging device of claim 4, wherein said high-power output is a wattage selected from the group consisting of: greater than about 40 W, greater than about 50 W, greater than about 60 W, and greater than about 70 W.

* * * * *